(12) United States Patent
Cartright et al.

(10) Patent No.: US 9,785,705 B1
(45) Date of Patent: Oct. 10, 2017

(54) GENERATING AND APPLYING DATA EXTRACTION TEMPLATES

(71) Applicant: Google Inc., Mountain View, CA (US)

(72) Inventors: Marc-Allen Cartright, Stanford, CA (US); Luis Garcia Pueyo, San Jose, CA (US); Vanja Josifovski, Los Gatos, CA (US); Amitabh Saikia, Mountain View, CA (US); Jie Yang, Santa Clara, CA (US); Mike Bendersky, Sunnyvale, CA (US); MyLinh Yang, Saratoga, CA (US)

(73) Assignee: GOOGLE INC., Mountain View, CA (US)

( * ) Notice: Subject to any disclaimer, the term of this patent is extended or adjusted under 35 U.S.C. 154(b) by 561 days.

(21) Appl. No.: 14/516,122

(22) Filed: Oct. 16, 2014

(51) Int. Cl.
*G06F 17/30* (2006.01)

(52) U.S. Cl.
CPC .............................. *G06F 17/30705* (2013.01)

(58) Field of Classification Search
CPC ................................................ G06F 17/30705
USPC ......................................................... 707/709
See application file for complete search history.

(56) References Cited

U.S. PATENT DOCUMENTS

| 6,253,169 | B1 * | 6/2001 | Apte ................... G06F 17/3071 704/9 |
| 7,475,010 | B2 | 1/2009 | Chao |
| 7,496,500 | B2 | 2/2009 | Reed et al. |
| 7,505,984 | B1 * | 3/2009 | Nevill-Manning . G06F 17/2211 |
| 7,512,605 | B2 | 3/2009 | Spangler |
| 7,836,012 | B1 | 11/2010 | Nevill-Manning et al. |
| 8,046,226 | B2 | 10/2011 | Soble et al. |
| 8,055,707 | B2 | 11/2011 | Desai et al. |
| 8,082,248 | B2 | 12/2011 | Abouyounes |

(Continued)

FOREIGN PATENT DOCUMENTS

| WO | 2013082151 | 6/2013 |
| WO | 2013192583 | 12/2013 |

OTHER PUBLICATIONS

Black, Julie et al, "Automated Event Extraction from Email," Jun. 2, 2004, (http://nlp.stanford.edu/courses/cs224n/2004/jblack-final-report.pdf ), 12 pages.

(Continued)

*Primary Examiner* — Mahesh Dwivedi
(74) *Attorney, Agent, or Firm* — Middleton Reutlinger

(57) ABSTRACT

Methods, apparatus, systems, and computer-readable media are provided for generating and applying data extraction templates. In various implementations, a corpus of plain text communications such as emails may be grouped into clusters based on one or more similarities between the plain text communications. One or more segments of communications of a particular cluster may be classified as transient based on textual pattern matching. One or more other segments of the communications of the particular cluster may be classified as transient based on various criteria. One or more transient segments may be assigned a generic and/or specific semantic data type and/or a confidentiality designation based on various signals. A data extraction template may be generated to extract, from subsequent plain text communications, content associated with transient (and in some cases, non-confidential) segments.

16 Claims, 7 Drawing Sheets

(56) References Cited

U.S. PATENT DOCUMENTS

| | | | |
|---|---|---|---|
| 8,108,206 B2 | 1/2012 | Hufnagel et al. | |
| 8,239,387 B2 | 8/2012 | Madaan et al. | |
| 8,364,467 B1 | 1/2013 | Bowman et al. | |
| 8,386,487 B1* | 2/2013 | Ben-Artzi | G06F 17/30705 707/737 |
| 8,458,584 B1* | 6/2013 | Wilson | G06F 17/30864 706/12 |
| 8,561,185 B1* | 10/2013 | Muthusrinivasan | G06F 21/6245 705/51 |
| 8,583,648 B1 | 11/2013 | Majkowska | |
| 8,589,366 B1* | 11/2013 | Younes | 707/602 |
| 8,630,989 B2 | 1/2014 | Blohm et al. | |
| 8,862,579 B2 | 10/2014 | Wissner et al. | |
| 9,652,530 B1* | 5/2017 | Bendersky | G06F 17/30705 |
| 2004/0044674 A1 | 3/2004 | Mohammadioun et al. | |
| 2006/0168006 A1 | 7/2006 | Shannon et al. | |
| 2008/0046441 A1 | 2/2008 | Wen et al. | |
| 2009/0012824 A1 | 1/2009 | Brockway et al. | |
| 2010/0100815 A1 | 4/2010 | Hutchinson et al. | |
| 2010/0179961 A1 | 7/2010 | Berry et al. | |
| 2010/0235367 A1 | 9/2010 | Chitiveli et al. | |
| 2010/0325115 A1 | 12/2010 | Xu | |
| 2011/0106892 A1 | 5/2011 | Nelson et al. | |
| 2011/0219081 A1* | 9/2011 | Parthasarathy | H04L 51/12 709/206 |
| 2012/0005221 A1 | 1/2012 | Ickman et al. | |
| 2012/0005284 A1* | 1/2012 | Tse | G06Q 10/10 709/206 |
| 2012/0215853 A1 | 8/2012 | Sundaram et al. | |
| 2012/0254181 A1 | 10/2012 | Schofield et al. | |
| 2012/0254388 A1 | 10/2012 | Duxbury et al. | |
| 2012/0297025 A1* | 11/2012 | Zeng | G06F 17/30864 709/217 |
| 2012/0317499 A1 | 12/2012 | Shen | |
| 2013/0117012 A1* | 5/2013 | Orlin | G06F 17/277 704/9 |
| 2013/0138655 A1* | 5/2013 | Yan | G06F 17/30867 707/738 |
| 2013/0239016 A1 | 9/2013 | Adams et al. | |
| 2013/0311875 A1 | 11/2013 | Pappas et al. | |
| 2015/0073895 A1* | 3/2015 | Karnin | G06Q 30/0251 705/14.49 |
| 2015/0358447 A1 | 12/2015 | Horling et al. | |
| 2016/0119268 A1* | 4/2016 | Sharp | H04L 51/12 709/206 |

OTHER PUBLICATIONS

Corston-Oliver, Simon et al, "Task-Focused Summarization of Email," Microsoft Research Jul. 2004, (http://www1.cs.columbia.edu/~lokesh/pdfs/Corston.pdf), 8 pages.

Laclavik, et al., "Email Analysis and Information Extraction for Enterprise Benefit," Institute of Informatics, Slovak Academy of Sciences, Slovakia, Computing and Informatics, vol. 30, 2011, pp. 57-87.

Paone, Lauren "Learned Automatic Recognition Extraction of Appointments from Email," 2006 (http://www.seas.upenn.edu/~cse400/CSE400_2005_2006/Paone/paper.pdf), 12 pages.

Walther, Maximilian "Unsupervised Extraction of Product Information from Semi-structured Sources," Computational Intelligence and Informatics (CINTI), 2012 IEEE 13th International Symposium, Nov. 20-22, 2012, 6 pages.

Grigalis, et al., "Using XPaths of Inbound Links to Cluster Template-Generated Web Pages," Department of Information Systems, Vilnius Gediminas Technical University, Lithuania, Computer Science and Information Systems, Oct. 25, 2013, 11(1):111-131.

Hachenberg, Christian et al., "Locality Sensitive Hashing for Scalable Structural Classification and Clustering of Web Documents," CIKM'13 Oct. 27-Nov. 1, 2013, San Francisco, CA, USA, Copyright 2013 ACM 978-1-4503-2263-8/13/10, 10 pages.

Chang, Chia Hui et al., "A Survey of Web Information Extraction Systems," Knowledge and Data Engineering, IEEE Transactions on , vol. 18, No. 10, Oct. 2006, pp. 1411-1428.

Abou-Shoer, Mohamed I. et al, "Extract-Template Modeling and Pattern Recognition in the Assessment of (Cymbopogon Proximus)," American Journal of Analytical Chemistry, vol. 2 No. 4, 2011, pp. 500-510.

Bonomi, Luca et al., "A Two-Phase Algorithm for Mining Sequential Patterns with Differential Privacy," ACM International Conference on Information and Knowledge Management, Oct. 27-Nov. 1, 2013, Burlingame, California, 10 pages.

Chang, Chia-Hui et al., "IEPAD: Information Extraction Based on Pattern Discovery," Proceedings of the 10th International Conference on World Wide Web, 2001, ACM, New York, NY, USA, pp. 681-688.

Kolya, Anup Kumar et al, "A Hybrid Approach for Event Extraction," Polibits (46) 2012, pp. 55-59, ISSN 1870-9044.

\* cited by examiner

To: c.h.smith@email.com  Date: 1/2/2013

From: utopia_A2@utopiaair.com

Subject: Charles, your journey to Utopia awaits!

++++++++++++++++++++++++++++++++++++++++++++++++++++++++

Utopian Airways

| | | | |
|---|---|---|---|
| Monday, July 14 | Departs: | 8:00 am Louisville, KY | Seat 16A |
| Utopian Airways | Arrives: | 9:36 am Cleveland, OH | |
| Flight No. 530 | | | |
| | | | |
| Monday, July 14 | Departs: | 10:05 am Cleveland, OH | Seat 18A |
| Utopian Airways | Arrives: | 11:56 am Manchester, NH | Seat 16B |
| Flight No. 66 | | | |
| | | | |
| Tuesday, July 15 | Departs: | 6:30 pm Manchester, NH | Seat 23A |
| Utopian Airways | Arrives: | 9:19 pm Atlanta, GA | Seat 23A |
| Flight No. 546 | | | |
| | | | |
| Tuesday, July 15 | Departs: | 9:59 pm Atlanta, GA | Seat 4 |
| Utopian Airways | Arrives: | 11:20 pm Louisville, KY | Seat 34E |
| Flight No. 2491 | | | |

Passenger Information:          Payment:

Charles H. Smith                $567.32 on Amex 123456789
Payment:                        Exp. Date: 01/02/2019
123456 Hayward Lane
Louisville, KY 556633
502-555-2588
c.h.smith@email.com Please arrive at the Airport at least 45 minutes prior to the scheduled departure. One checked bag flies free, any subsequent bags incur an additional charge of $30.

Fig. 5         500

GENERATING AND APPLYING DATA EXTRACTION TEMPLATES

BACKGROUND

Business-to-consumer ("B2C") emails and similar communications often may follow more structured patterns than person-to-person emails, with many being created automatically using templates. However, these templates or other workflows for creating B2C communications are not typically made available to entities interested in extracting data from these communications. Some B2C communications may be structured using markup languages such as the Hyper Text Markup Language ("HTML") or the Extensible Markup Language ("XML"). Other B2C communications may take the form of plain text.

SUMMARY

The present disclosure is generally directed to methods, apparatus and computer-readable media (transitory and non-transitory) for analyzing a corpus of plain text communications such as B2C emails to generate one or more data extraction templates. The generated one or more data extraction templates may be configured to extract non-confidential transient content from subsequent plain text communications, while ignoring confidential transient content or fixed content that is shared among the plain text communications of the corpus (e.g., boilerplate). For example, the data extraction template may be used to extract, from an email, non-confidential transient content (e.g., information that alone cannot be used to identify someone) such as departure time, arrival time, arrival airport, product purchased, shipping date, price, etc. Confidential information (e.g., information that could be used to identify someone) such as a recipient's name, address, credit card number, and so forth, as well as fixed boilerplate, may be ignored and/or scrambled or otherwise concealed.

In some implementations, a corpus of plain text communications may be initially grouped into a plurality of clusters based on similarities between the plain text communications and/or their metadata/context. For instance, flight itinerary emails from one airline may form one cluster; flight itinerary emails from another airline may form another cluster. A data extraction template may then be generated for each cluster as described above. Subsequent plain text communications may be analyzed using the same technique as was used to initially group the corpus of plain text communications into clusters. The cluster to which a subsequent plain text communication is matched may dictate the data extraction template that is used to extract transient non-confidential content from the plain text communication.

In some implementations, a computer implemented method may be provided that includes the steps of: grouping a corpus of plain text communications into a plurality of clusters based on one or more shared attributes; classifying one or more segments of each plain text communication of a particular cluster as fixed in response to a determination that a count of occurrences of the one or more segments across the particular cluster satisfies a criterion; classifying one or more remaining segments of each plain text communication of the particular cluster as transient; and generating, based on sequences of classified segments associated with each plain text communication of the particular cluster, a data extraction template to extract, from one or more plain text communications, content associated with transient segments.

This method and other implementations of technology disclosed herein may each optionally include one or more of the following features.

In some implementations, the method may further include identifying, in each plain text communication of the particular cluster based on one or more textual patterns, one or more transient segments. In some implementations, the method may further include assigning generic semantic data types to one or more identified transient segments in each plain text communication of the particular cluster based on the one or more textual patterns. In some implementations, the method may further include assigning specific semantic data types to one or more transient segments in each plain text communication of the particular cluster based on a context of the plain text communications of the particular cluster or one or more heuristics.

In some implementations, the one or more shared attributes may include a subject or data indicative of a sending entity. In some implementations, the method may further include associating a plurality of different sender identifiers with a single sending entity based on one or more textual patterns shared among the plurality of different sender identifiers. In some implementations, the method may further include configuring the data extraction template so that content associated with segments classified as fixed are ignored in one or more plain text communications.

In some implementations, the method may further include generating a tree to represent the sequences of classified segments associated with each plain text communication of the particular cluster. In some implementations, the method may further include including a first branch in the tree to represent a first sequence of classified segments corresponding to a first plain text communication of the particular cluster; and including a second branch in the tree to represent at least part of a second sequence of classified segments corresponding to a second plain text communication of the particular cluster, wherein the second sequence of classified segments is different than the first sequence of classified segments. In some implementations, the method may further include rating an extraction performed on a plain text communication using the template based on traversal of the tree using a sequence of classified segments generated for the plain text communication.

In some implementations, the method may further include classifying a particular segment of each plain text communication of the particular cluster as fixed in response to a determination that the particular segment provides visual structure to each plain text communication. In some implementations, the method may further include generating the data extraction template to ignore, in one or more plain text communications, content associated with a particular transient segment in response to a determination, based on one or more signals related to plain text communications of the particular cluster, that a semantic data type of the particular transient segment is confidential.

Other implementations may include a non-transitory computer readable storage medium storing instructions executable by a processor to perform a method such as one or more of the methods described above. Yet another implementation may include a system including memory and one or more processors operable to execute instructions, stored in the memory, to perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 5 depicts an example plain text communication with segments that may be transient, fixed, confidential and/or non-confidential.

DETAILED DESCRIPTION

Figure 1:
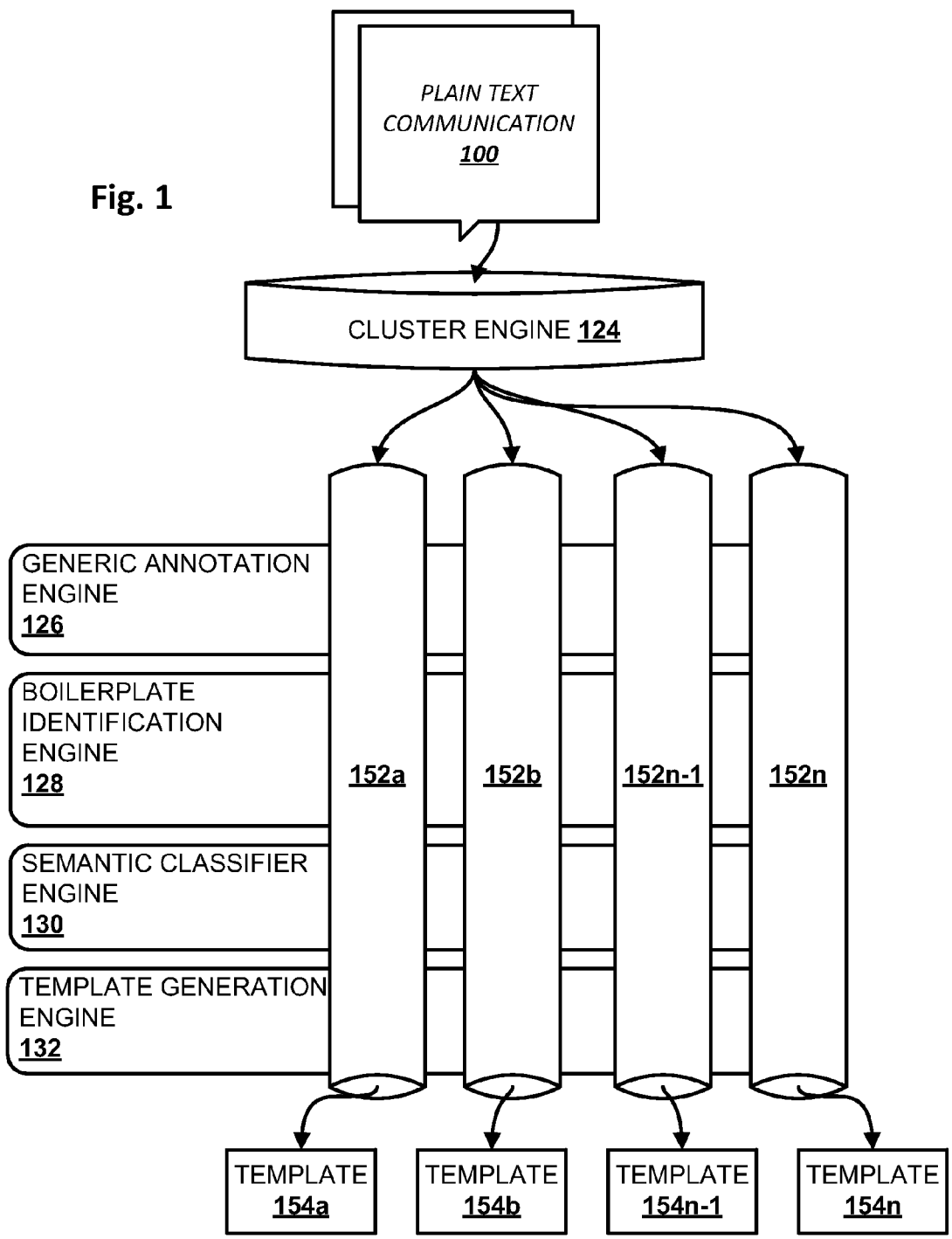
FIG. 1 illustrates an example of how a corpus of plain text communications may be analyzed by various components of the present disclosure to generate one or more data extraction templates.

FIG. 1 illustrates an example environment in which a corpus of plain text communications 100 may be grouped into clusters 152a-n, and in which clusters 152a-n of plain text communications may be analyzed to generate data extraction templates 154a-n. As used herein, a "plain text communication" may refer to an email (e.g., text/plain), a text message (e.g., SMS, MMS), an instant message, or any other plain text communication, particularly B2C communications, that are typically (but not always) automatically generated. In various implementations, a plain text communication 100 may include various metadata. For instance, emails may include one or more sender identifiers (e.g., sender email addresses), one or more recipient identifiers (e.g., recipient email addresses, including cc'd and bcc'd recipients), a date sent, one or more attachments, a subject, and so forth.

In some implementations, a cluster engine 124 may be configured to group the corpus of plain text communications 100 into a plurality of clusters 152a-n based on one or more attributes shared among one or more plain text communications 100 within the corpus. In some implementations, cluster engine 124 may have one or more preliminary filtering mechanisms to discard communications that are not suitable for template generation. For example, if a corpus of plain text communications 100 under analysis includes personal emails and B2C emails, personal emails may be discarded. Cluster engine 124 may utilize various attributes of plain text communications 100 to group B2C and other similar plain text communications into clusters, such as metadata, textual similarities, byte similarities, communication context, and so forth. In some implementations, cluster engine 124 may use metadata such as a sending entity or a subject of email, alone or in combination, to select a cluster to which the email belongs.

Cluster engine 124 may use various techniques to perform plain text communication clustering. In some implementations, cluster engine 124 may be configured to analyze an email subject using one or more regular expressions. For example, emails from a particular sending entity (which may include emails from more than one email address) may be analyzed to determine a frequency of words found in the emails' subjects. Words satisfying a particular criterion (e.g., a count of occurrences being above frequency threshold) may be considered "fixed." Words that do not satisfy the criterion may be considered "transient." In some implementations, the emails' subjects may then be analyzed again to generate regular expressions. Fixed terms may remain unchanged in the regular expressions (e.g., represented as "constants"). Transient words/terms may be replaced with regular expression wildcards. In some implementations, each element of the set of unique regular expressions may represent a unique cluster. An email may be assigned to a cluster associated with a regular expression that best matches the email's subject. A cluster may be considered a "best match" for an email based on various metrics, such as the cluster having the longest matching regular expression for the email's subject.

In some implementations, plain text communications such as emails may be clustered additionally or alternatively based on textual similarities. For example, emails may be analyzed to determine shared terms, phrases, ngrams, ngrams plus frequencies, and so forth. Based on these data points, emails may be clustered. For example, emails sharing a particular number of shared phrases and ngrams may be clustered together. In some implementations, emails may even be grouped into clusters based on byte similarity. For instance, emails may be viewed as strings of bytes that may include one or both of metadata and textual content. In some implementations, a weighted combination of two or more of the above-described techniques may be used as well. For example, both subject matching and textual similarity may be considered, with a heavier emphasis on one or the other.

Once a corpus of plain text communications are grouped into clusters 152a-n, each cluster may contain plain text communications that are highly likely to include the same or similar fixed content (e.g., boilerplate), and to have transient content (which may be the primary data of interest for extraction) in approximately the same locations, e.g., spatially and/or relative to fixed segments. A generic annotation engine 126, boilerplate identification engine 128, semantic classifier engine 130, and template generation engine 132 may then perform various downstream processing to produce data extraction templates 154a-n for clusters 152a-n.

Generic annotation engine 126 may be configured to classify, within plain text communications of a particular cluster 152 using techniques such as textual pattern matching, one or more segments that typically include transient content. These segments may include but are not limited to dates (e.g., "MM/DD/YYYY"), prices, names, addresses, phone numbers (e.g., "(ddd)-ddd-dddd"), and so forth. In various implementations, generic annotation engine 126 may additionally or alternatively assign generic semantic data types to these transient segments. For example, a segment that matches a textual pattern such as "MM/DD/YYYY" or "DD/MM/YYYY" may be assigned a generic semantic data type of "date." A segment that matches a textual pattern such as "$dd.dd", "€ dd.dd", "¥ddd", "₭ ddd", "₮ dd", and so forth, may be assigned a generic semantic data type of "dollar amount." In some implementations, generic annotation engine 126 may classify remaining segments of text as "undecided."

Boilerplate identification engine 128 may be configured to selectively classify other (e.g., undecided) segments of plain text communications as fixed or transient using various criteria and/or techniques. In some implementations, boilerplate identification engine 128 may store segments of a particular cluster it classifies as fixed in a dictionary or vocabulary it generates for that cluster (e.g., as a "bag of words or phrases"). In some implementations, boilerplate identification engine 128 may employ shingling, e.g., to find the longest runs of fixed text in plain text communications of a cluster. In some implementations, boilerplate identification engine 128 may employ tokenization to further analyze undecided segments. In some implementations, boilerplate identification engine 128 may classify a particular segment as fixed in response to a determination, e.g., by boilerplate identification engine 128, that a particular criterion has been satisfied. Various criteria may be used to determine that a particular segment of text is fixed.

One criterion that may be used by boilerplate identification engine 128 to determine whether segments of text are fixed is a threshold. For instance, if a count of occurrences of a segment of text across a particular cluster satisfies a particular threshold number of emails or a percentage, it may be considered fixed. Suppose a particular segment of text such as "your departure time/date is" or "Thank you for your purchase, which is scheduled to ship on" is shared among a large number of emails in a cluster (or even among all emails). That segment of text is likely boilerplate. Boilerplate identification engine 128 may classify that segment of text as "fixed."

Another criterion that may be used by boilerplate identification engine 128 to determine whether segments of text are fixed is whether a particular segment provides visual structure to a plain text communication. In plain text emails, for instance, HTML and/or XML may not be available to provide visual structure such as tables or bullet point lists, or even different fonts or text sizes. In order to make plain text communications visually appealing and/or digestible, and/or to enable emphasis of particular portions, various characters may be used creatively to provide visual structure. For example, a row of "=====" or "_____" may provide a horizontal separator between one portion of a plain text communication and another. The character "|" may be used with tabs and other white space characters as a vertical separator. Tabs and other whitespace characters may be used to organize plain text emails in a manner that makes them easy to read, for instance, on a mobile phone screen.

Boilerplate identification engine 128 may use various techniques, such as heuristics, machine learning, pattern matching, or frequency thresholds, to determine whether a segment of text is meant to provide visual structure to a plain text communication. For instance, if particular non-alphabetical and non-numeric characters such as "=", "+", "|", "*", "#", "~", "/", ":", "'", ">", "<", "\", "−" and so forth appear consecutively or in combination with each other in a segment, that segment may be classified as fixed.

In various implementations, boilerplate identification engine 128 may classify remaining (e.g., undecided) segments of text that do not satisfy various fixed text criteria such as those described above as "transient." In some implementations, the output of boilerplate identification engine 128 is one or more sequences of classified (e.g., "fixed" or "transient") segments of text. In some embodiments, a data extraction template 154 may include a key/value pair, with the "key" being information such as metadata/subject/sending entity that is matched to subsequent plain text communications, and the "value" including all other information necessary to perform data extraction.

Figure 3:
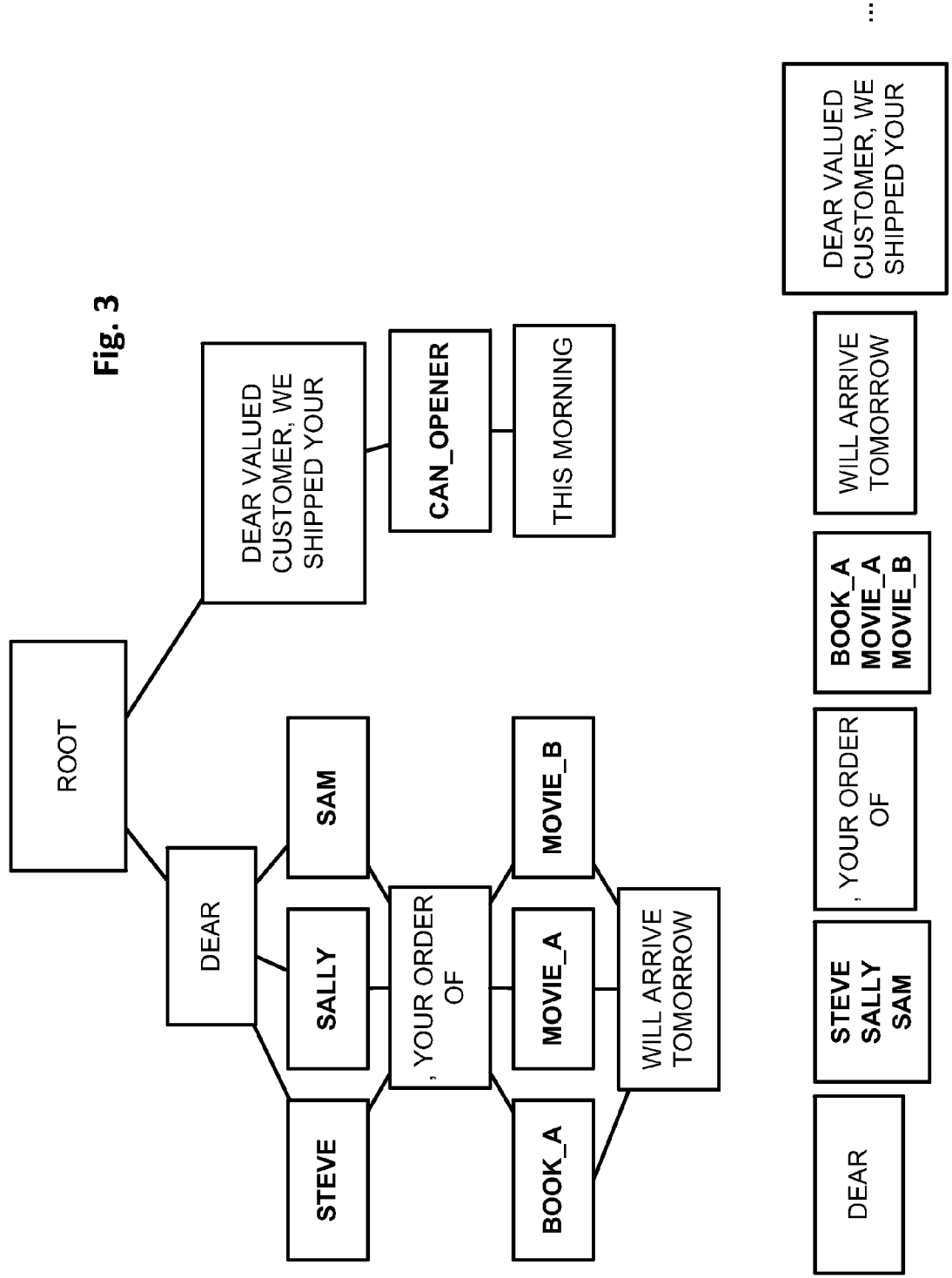
FIG. 3 depicts on example of how a tree of classified segments may be organized into a data extraction template, in accordance with various embodiments.

In some implementations, generic annotation engine 126 and/or boilerplate identification engine 128 may construct a graph such as a tree to represent various sequences of classified segments of text. Branches of the tree may represent all sequences of classified segments observed in a cluster of plain text communications. For example, in some implementations, sequences of classified segments may be iteratively traversed and added to the tree. As a sequence of segments is traversed, if a branch or path that corresponds to the next classified segment in the sequence already exists in the tree at the same location, that branch or path may be followed (and in some instances a count associated with one or more leaves or nodes may be incremented). If a branch or path corresponding to the next classified segment in the sequence does not exist, a new branch or path may be added and followed. An example tree is depicted in FIG. 3 and described below.

In some implementations, optional semantic classifier engine 130 may be configured to perform "contextual refinement," in which it reassigns transient segments of text already assigned generic data types (e.g., by generic annotation engine 126) with more specific semantic data types. Semantic classifier engine 130 may make these determinations based on various signals. One example signal that may be used by semantic classifier engine 130 is a context of the plain text communications of a particular cluster. Suppose the cluster includes emails from a particular airline reporting itineraries to passengers. That general context may enable semantic classifier engine 130 to search for cues that might typically be located in such emails, such as words like "Departure," "Depart," etc., particularly in combination with other cues, such as a colon following a particular word. For example, one or more fixed segments of text contained in plain text communications of the cluster within a particular distance of a particular segment of text may be analyzed to determine what the particular segment of text is meant to communicate. If a transient segment of text, "May 1, 2015 at 8:00 am," is immediately preceded by a fixed segment of text, "Depart," and particularly if a colon or dash is between them, then semantic classifier engine 130 may reassign the transient segment of text with a specific semantic data type, such as a Departure Date/Time. In various implementations, semantic classifier engine 130 may use other techniques, including one or more machine learning classifiers (e.g., regular-expression based, non-linear trained with external data), to detect semantic data types for transient segments of text.

In some implementations, semantic classifier engine 130 may employ various techniques to protect information users may consider sensitive or otherwise confidential. For example, semantic classifier engine 130 may classify (or reclassify) one or more segments of text, previously classified as transient, as "confidential." In subsequent processing of plain text communications (see FIG. 4), transient, but confidential, segments of text may be ignore or otherwise discarded.

Semantic classifier engine 130 may classify (or reclassify) a particular transient segment of text as confidential based on various signals. For example, sensitive data like credit card numbers or social security numbers may have known numeric patterns that semantic classifier engine 130 may recognize. Semantic classifier engine 130 may also determine that an otherwise transient segment of text should be deemed confidential based on semantic data types assigned to other transient segments, e.g., located nearby in a plain text communication. For example, a user's departure date alone may not be considered sensitive. However, if a nefarious party where to learn about a user's departure date in combination with the user's identity and/or address, that nefarious party may deduce that the user will be out of town as of the departure date. In such a scenario, semantic classifier engine 130 may classify the transient segment of text containing the departure date in the email as non-confidential transient, but may reclassify transient segments of text containing other information that could be used to identify the user, such as their name, address, phone number, email address, job title, etc., as confidential. Some semantic data types may automatically be classified, e.g., by semantic classifier engine 130, as confidential, such as credit card numbers, user-identifying information (e.g., name, social security number, full address, etc.), information related to a user's health, and so forth.

Template generation engine 132 may be configured to generate one or more data extraction templates 154a-n, e.g., based the classified sequences of classified segments provided by generic annotation engine 126, boilerplate identification engine 128, and/or semantic classifier engine 130. Those data extraction templates may be usable by various components (see FIG. 2) to extract, from one or more plain text communications, content from one or more transient segments of text.

Operations performed by cluster engine 124, generic annotation engine 126, semantic classifier engine 130, and/or template generation engine 132 may be performed on individual computer systems, distributed across multiple computer systems, or any combination of the two. These one or more computer systems may be in communication with each other and other computer systems over one or more networks (not depicted).

Figure 2:
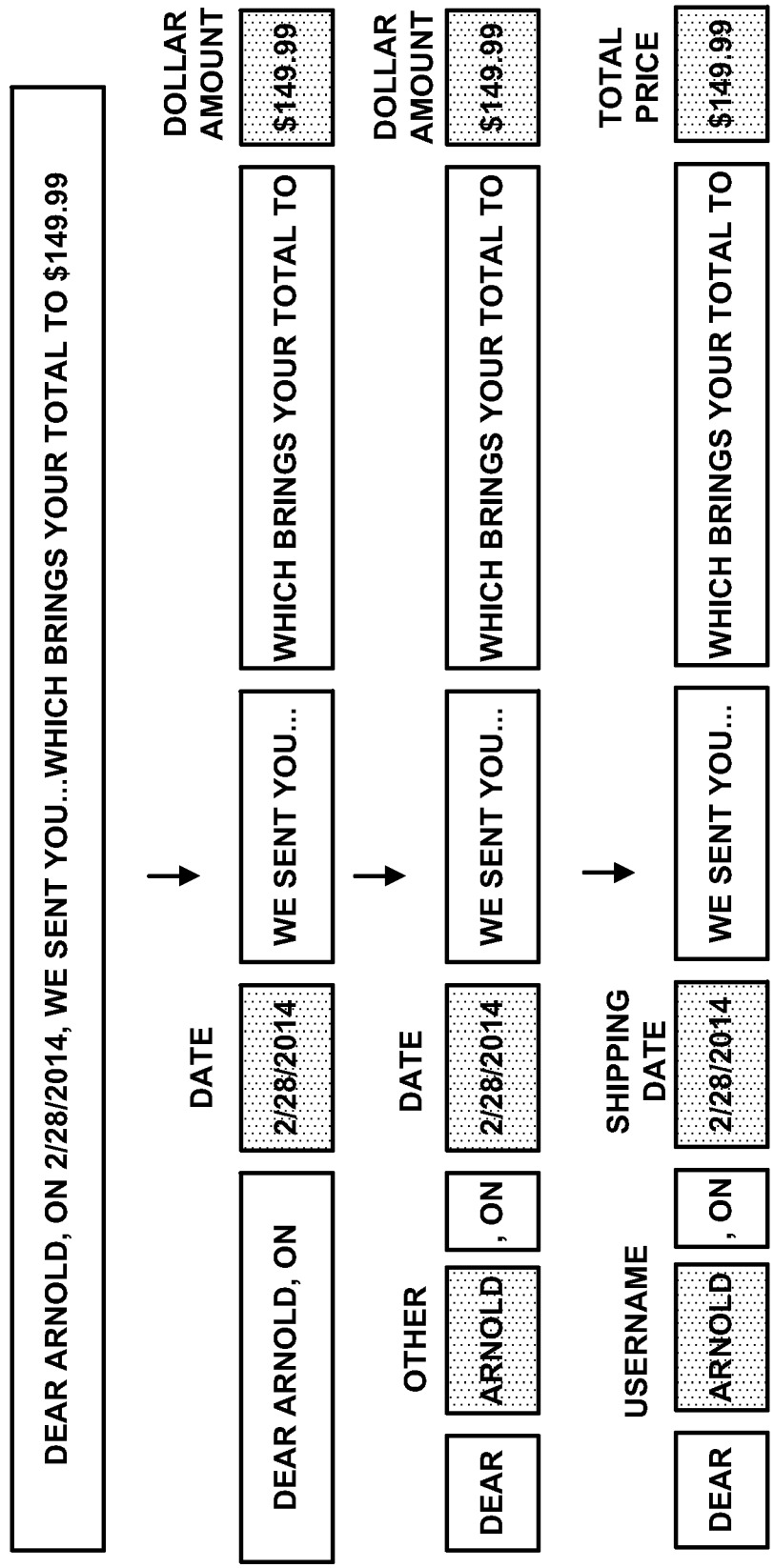
FIG. 2 depicts how stages of analysis may affect a plain text communication, in accordance with various embodiments.

FIG. 2 depicts an example of how text may be classified by constituent components of FIG. 1, in accordance with various implementations. The original message is contained at the top level. The second level includes a sequence of segments of text that have been preliminarily classified, e.g., by generic annotation engine 126. The shaded segments ("2/28/2014" and "149.99") have been classified as transient, and have been assigned generic semantic data types (e.g., "DATE" and "DOLLAR AMOUNT"). The remaining segments are classified for the moment as "undecided."

The third row includes the sequence of segments after being processed by boilerplate identification engine 128. Most of the undecided segments are now classified as "fixed," e.g., because they satisfy some frequency threshold. The segment containing the text "ARNOLD" has been classified as transient, with a generic semantic data type of "OTHER." The fourth row includes the sequence of classified segments after being processed by semantic classifier engine 130. The semantic data types "OTHER," "DATE," and "DOLLAR AMOUNT" have been contextually refined and reassigned specific semantic data types "USERNAME," "SHIPPING DATE" and "TOTAL PRICE," respectively.

FIG. 3 depicts one example of how sequences of classified segments organized into a tree may be stored in a data extraction template, in accordance with various implementations. In this example, the tree may be encoded into a data extraction template 154 (see FIG. 1), e.g., using a pre-order depth-first walk over the tree, in which the segments may be stored in the order visited. For instance, Steve, Sally, and Sam are three recipients whose names were found in a transient segment associated with a recipient name. The three of them purchased three different products found in another transient segment: "BOOK_A," "MOVIE_A," and "MOVIE_B." This is represented in the left branch. Another branch on the right represents a different plain text email in which "Valued Customer" is used instead of a particular user's name.

At the bottom of FIG. 3 is a sequence of segments that results from depth-first walk through of the tree. The sequence at bottom may be stored as part of a data extraction template in various ways, e.g., as an array or linked list. Additional information can optionally be stored in the data extraction template to enable the entire tree to be reconstructed later, e.g., during data extraction. In some implementations, the tree may be used later to rate and/or improve data extraction. For example, the tree may be used to provide confidences of the quality of template matching or of the quality of a particular assigned semantic data type.

Figure 4:
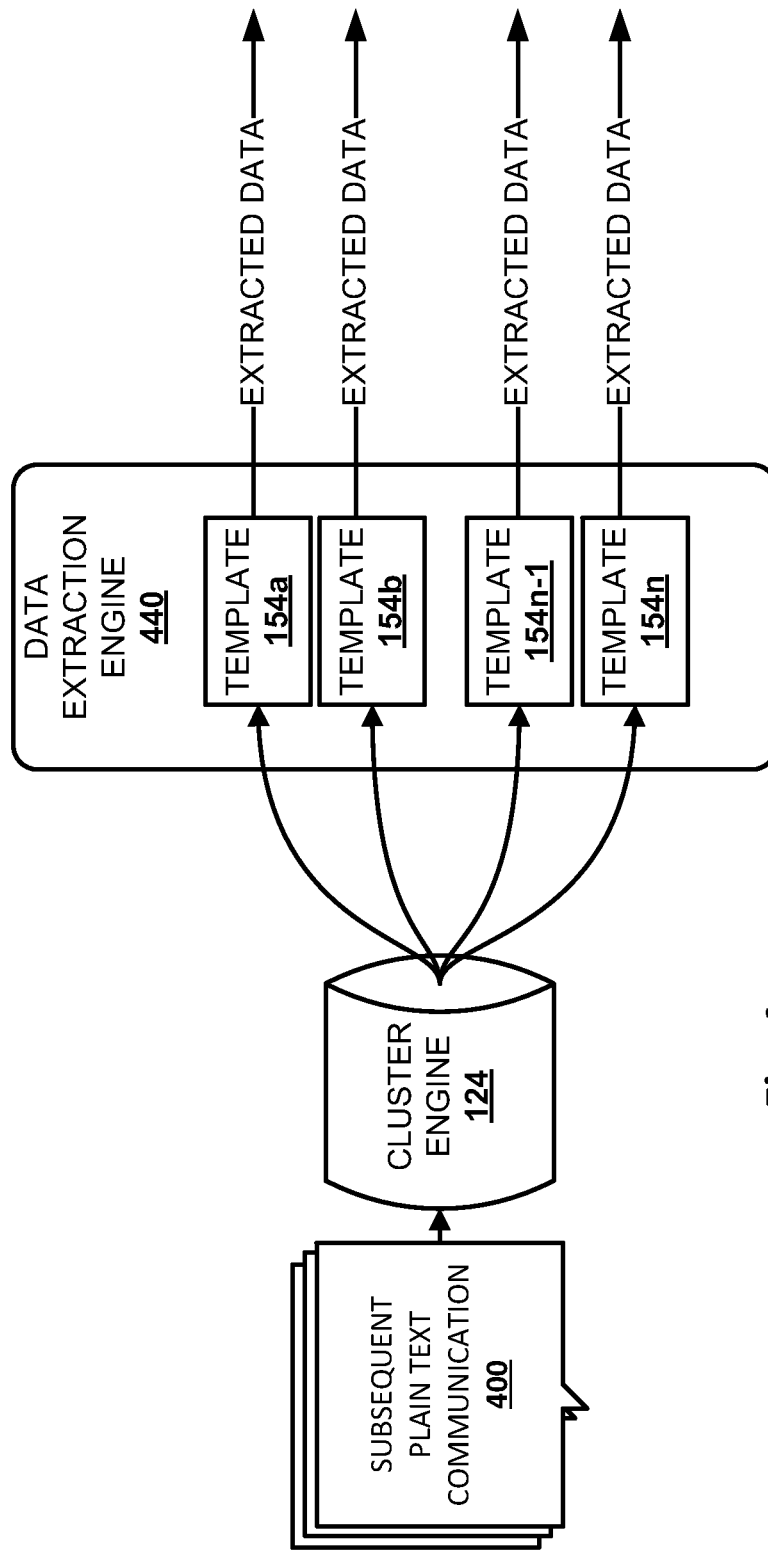
FIG. 4 illustrates an example of how data may be extracted from a subsequent plain text communication using one or more templates generated in FIG. 1.

FIG. 4 depicts an example of how subsequent plain text communications 400 may be analyzed after a plurality of data extraction templates 154a-n have been generated. Cluster engine 124 may be configured to employ techniques similar to those described above to determine with which cluster plain text communications 400 should be associated.

Based on the decision of cluster engine 124, a data extraction engine 440 may select and apply a data extraction template (e.g., one of 154a-n) to the plain text communication to extract the appropriate data. For example, data extraction engine 440 may utilize a particular template 154 to extract content associated with segments of text classified as non-confidential and transient from the plain text communication 400. Data extraction engine 440 may likewise ignore or discard content associated with segments of text classified as confidential and/or fixed.

In some implementations, data extraction engine 440 may employ techniques similar to those used during template creation to generate a sequence of classified segments. For example, data extraction engine 440 may classify and/or annotate segments of text in subsequent plain text communications 400 that match known textual patterns ("MM/YY/DD") first, e.g., much in the way generic annotation engine 126 did in FIG. 1. Data extraction engine 440 may additionally or alternatively use the stored dictionary or vocabulary of fixed words or phrases associated with the data extraction template to identify and annotate fixed segments of the communication 400. Remaining "undecided" segments may be classified as transient. Data extraction engine 440 may then extract content from segments it classifies as transient.

In various implementations, a data extraction performed by data extraction engine 440 on a subsequent plain text communication 400 using a data extraction template 154 may be rated. For example, in some implementations, extracted content and/or segments of subsequent plain text communications 400 classified as fixed may be considered as sets or bags of words/phrases. In some implementations, fixed segments may be compared to a dictionary or vocabulary of fixed phrases that is included in a data extraction template as described above. The closer the set membership, the better the extraction. In some implementations, content extracted from transient segments may be compared to generic and/or specific semantic data types assigned to transient segments in the data extraction template 154 to determine fidelity of the extraction.

In other implementations, the tree generated mentioned above as being generated during template generation may be reconstructed, e.g., using a sequence of classified segments such as the one at the bottom of FIG. 3, and used to analyze quality of data extraction. For example, the tree may be reconstructed, and a sequence of classified segments generated from subsequent plain text communications 400 by data extraction engine 440 may be used to traverse the tree. The closer the traversal is to a complete path from the root to a leaf node, the higher the fidelity of the extraction. In some implementations, the quality of a data extraction template itself may be analyzed using one or more attributes the tree. For example, the "width" of the tree (e.g., how many separate branches it has) generated for a particular cluster of plain text communications may be indicative of a utility of the data extraction template generated for that cluster. In some embodiments, a measure of that utility may be assigned to the data extraction template, e.g., as a "confidence," and may be used in addition to or instead of other techniques described herein to assess quality of data extraction.

FIG. 5 depicts a hypothetical email 500 showing how various portions of the email 500 may be classified, e.g., by generic annotation engine 126, boilerplate identification engine 128, and/or semantic classifier engine 130, in accordance with various implementations. Email 500 includes various metadata, visible examples of which include a recipient email address ("c.h.smith@email.com"), a sender email address ("utopia_A2@utopiaair.com"), a date received (1/2/2014) and a subject ("Charles, your journey to Utopia awaits").

Suppose email 500 is part of a corpus being used to generate one or more data extraction templates. As noted above, various metadata may be used to group email 500 into a cluster that includes other similar emails. In some implementations, a "sending entity" and/or a subject may be used to group email into a cluster with other emails with a similarly-structured subject and the same sending entity. A "sending entity" may not be limited to a single email address, but instead may refer generally to a source of communications (e.g., an airline, a retailer) that may utilize more than one email address to transmit B2C communications. For example, an airline may send itineraries from "customer_service@airline.com," "reminder@airline.com," "check-in@airline.com," and so forth. In various embodiments, various pattern recognition techniques such as regular expressions may be used to determine that a particular sender email address (e.g., "utopia_A2@utopiaair.com") is actually associated with a sending entity (e.g., Utopia Airways in this hypothetical).

Once email 500 is grouped with other similar emails in a cluster, a data extraction template may be generated for that cluster using various combinations of the techniques described above. Transient content that is unlikely shared among more than a few emails of the cluster may be identified, e.g., by generic annotation engine 126 and/or boilerplate identification engine 128. For example, segments following the "Departs:" and "Arrives:" segments (e.g., 8:00 am Louisville, Ky.," "9:36 am Cleveland, Ohio," etc.) may be considered transient because it is unlikely that more than a small fraction of the emails in the cluster will contain the exact same text associated with these segments of text. The same goes for other pieces of information, like the price paid ("$567.32"), the credit card number/expiration date, the passenger's address and other contact information, and so forth.

By contrast, segments of text that are likely boilerplate shared among many or all emails of the cluster may be classified, e.g., by boilerplate identification engine 128, as fixed. These may include segments of text like the title "Utopian Airways," "Passenger Information:," "Payment:," and the text at the bottom informing the user when to arrive at the airport and how much checked bags will cost. These may also include segments included to provide visual structure, such as the row of "+++++++ . . . " separating the metadata at top from the message.

As noted above, various signals such as nearby fixed text may be used, e.g., by semantic classifier engine 130, to associate one or more generic and/or specific semantic data types with the various transient segments. For example, the segment containing the text "8:00 am Louisville, Ky." may be classified as a departure data and location based on the context of email 500 (providing the passenger's itinerary) and/or nearby fixed text, such as "Departs:". The segment containing the text "$567.32" may be classified as payment made based on, for example, its proximity to the fixed segment, "Payment:".

Segments of text that otherwise may be classified as transient may further (or alternatively) be classified as "confidential" (or "private," "sensitive," etc.) based on one or more semantic data types assigned to them. For instance, in FIG. 5, the user's name and/or contact information, as well as the user's credit card number and/or payment amount, while transient, may additionally or alternatively be classified confidential. These segments of text may be so-designated in a data extraction template generated downstream, so that this information is ignored, discarded, and/or scrambled in the future, preserving users' privacy.

Figure 6:
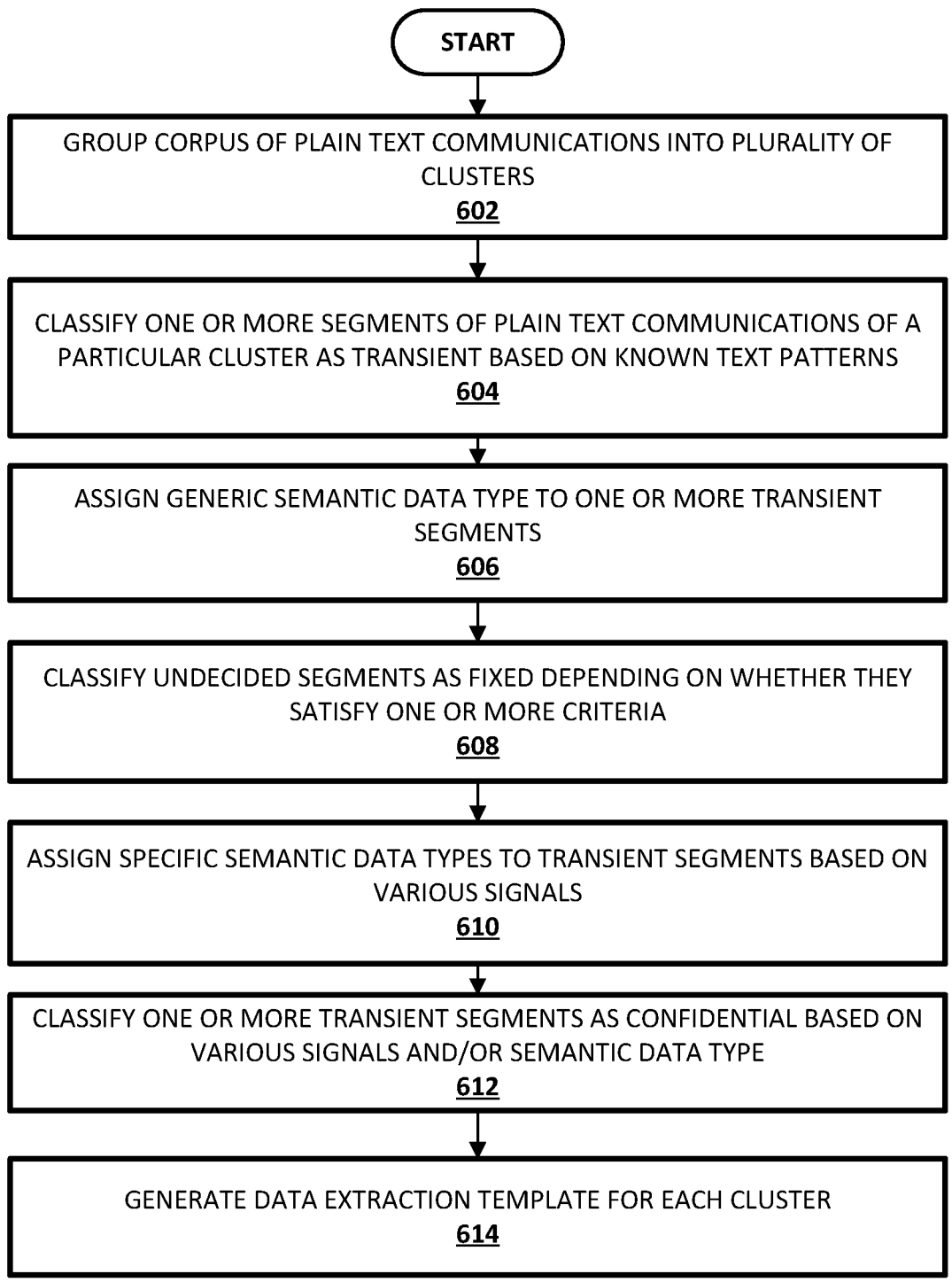
FIG. 6 depicts a flow chart illustrating an example method of generating data extraction templates.

Referring now to FIG. 6, an example method 600 of clustering plain text communications and generating data extraction templates is described. For convenience, the operations of the flow chart are described with reference to a system that performs the operations. This system may include various components of various computer systems. Moreover, while operations of method 600 are shown in a particular order, this is not meant to be limiting. One or more operations may be reordered, omitted or added.

At block 602, the system may group a corpus of plain text communications into a plurality of clusters, e.g., based on one or more pieces of metadata associated with each plain text communication. For instance, a sending entity in combination with one or more textual patterns in an email subject may be used to select a cluster for an email.

At block 604, the system may classify and/or annotate, e.g., based on various known textual patterns (e.g., "MM/DD/YY"), from plain text communications in a particular cluster, one or more segments as transient. As noted above, remaining segments may be classified as "undecided" for now. At block 606, the system may assign the one or more transient segments classified at block 604 generic semantic data types (e.g., "date," "monetary amount"), e.g., based on the same textual patterns used to classify those segments as transient.

At block 608, the system may classify one or more undecided segments as fixed, e.g., depending on whether those segments of text satisfy one or more thresholds or other criteria. At block 610, the system may perform contextual refinement to assign one or more specific semantic data types to one or more transient segments, e.g., based on various signals described above.

At block 612, the system may classify (or reclassify) one or more transient segments as confidential based on various signals and/or semantic data types assigned to the one or more segments at block 604 or 610. For example, a transient segment that is assigned the semantic data type "user address" may be classified as confidential. A segment that is assigned the semantic data type "product dimensions" may be classified as non-confidential (depending on the context).

At block 614, the system may generate a data extraction template for each cluster. As noted above and as shown in FIG. 4, the data extraction template may be usable, e.g., by data extraction engine 440, to extract, from subsequent plain text communications, content from segments of text classified as transient, and to ignore and/or discard content associated with fixed and/or confidential segments of text.

Figure 7:
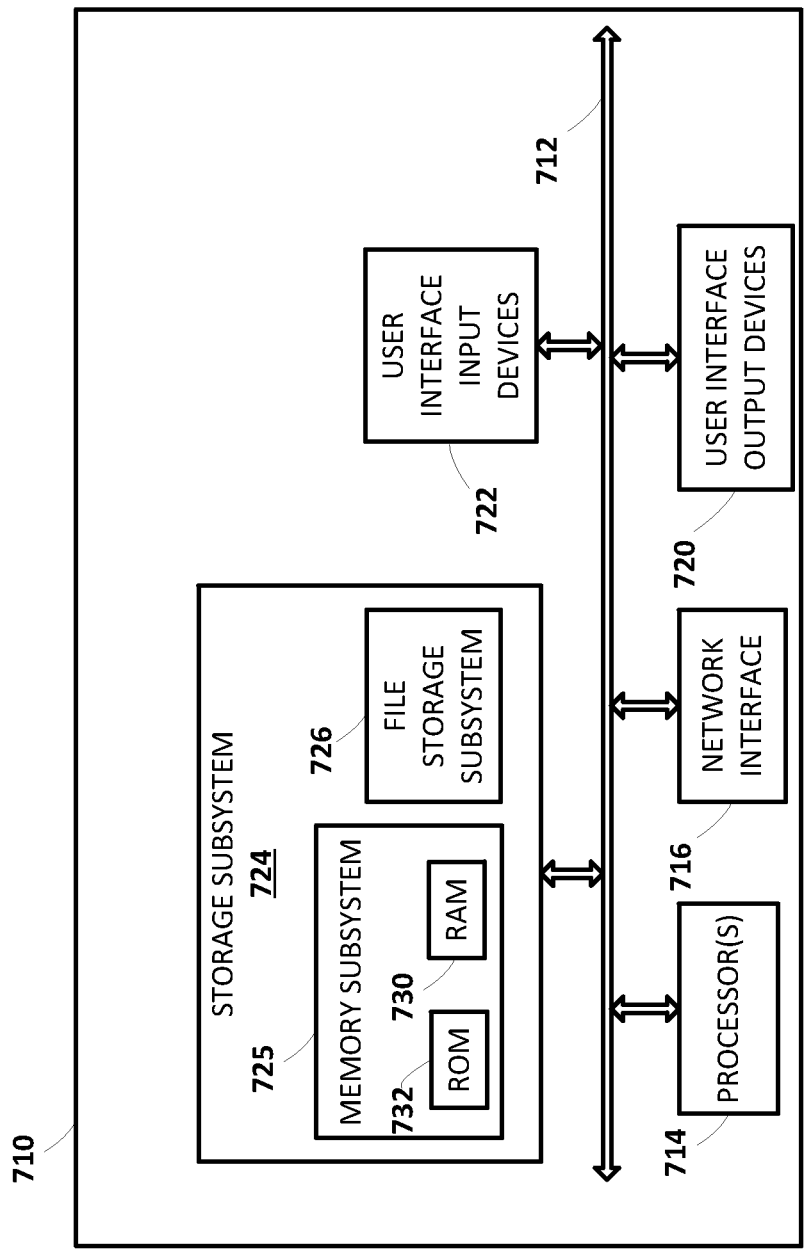
FIG. 7 schematically depicts an example architecture of a computer system.

FIG. 7 is a block diagram of an example computer system 710. Computer system 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computer system 710. Network interface subsystem 716 provides an interface to outside networks and is coupled to corresponding interface devices in other computer systems.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 710 to the user or to another machine or computer system.

Storage subsystem 724 stores programming and data constructs that provide the functionality of some or all of the modules described herein. For example, the storage subsystem 724 may include the logic to perform selected aspects of method 600 and/or to implement one or more of cluster engine 124, generic annotation engine 126, boilerplate identification engine 128, semantic classifier engine 130, template generation engine 132, and/or data extraction engine 440.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computer system 710 communicate with each other as intended. Although bus subsystem 712 is shown schematically as a single bus, alternative implementations of the bus subsystem may use multiple busses.

Computer system 710 can be of varying types including a workstation, server, computing cluster, blade server, server farm, or any other data processing system or computing device. Due to the ever-changing nature of computers and networks, the description of computer system 710 depicted in FIG. 7 is intended only as a specific example for purposes of illustrating some implementations. Many other configurations of computer system 710 are possible having more or fewer components than the computer system depicted in FIG. 7.

In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A computer-implemented method for generating and applying data extraction templates to extract transient content from plain text communications created automatically using templates, comprising:
   grouping a corpus of plain text communications into a plurality of clusters based on one or more shared attributes;
   classifying one or more plain text segments of each plain text communication of a particular cluster as fixed in response to a determination that a count of occurrences of the one or more plain text segments across the particular cluster satisfies a criterion;

classifying one or more remaining plain text segments of each plain text communication of the particular cluster as transient;

generating a tree to represent sequences of classified plain text segments associated with each plain text communication of the particular cluster, wherein the tree includes at least a first branch to represent a first sequence of classified plain text segments corresponding to a first plain text communication of the particular cluster and a second branch to represent at least part of a second sequence of classified plain text segments corresponding to a second plain text communication of the particular cluster, wherein the second sequence of classified plain text segments is different than the first sequence of classified plain text segments;

generating, based on the tree, a data extraction template to extract, from one or more subsequent plain text communications, content associated with transient segments;

extracting content associated with at least one transient segment from a given subsequent plain text communication addressed to a user by applying the data extraction template to the given subsequent plain text communication; and rating the extracting performed on the given subsequent plain text communication based on how closely a sequence of classified plain text segments generated for the given subsequent plain text communication traverses a branch of the tree.

2. The computer-implemented method of claim 1, further comprising identifying, in each plain text communication of the particular cluster based on one or more textual patterns, one or more transient plain text segments.

3. The computer-implemented method of claim 2, further comprising assigning generic semantic data types to one or more identified transient plain text segments in each plain text communication of the particular cluster based on the one or more textual patterns.

4. The computer-implemented method of claim 3, further comprising assigning specific semantic data types to one or more transient plain text segments in each plain text communication of the particular cluster based on a context of the plain text communications of the particular cluster or one or more heuristics.

5. The computer-implemented method of claim 1, wherein the one or more shared attributes comprise a subject or data indicative of a sending entity.

6. The computer-implemented method of claim 5, wherein the grouping comprises associating a plurality of different sender identifiers with a single sending entity based on one or more textual patterns shared among the plurality of different sender identifiers.

7. The computer-implemented method of claim 1, further comprising configuring the data extraction template so that content associated with plain text segments classified as fixed are ignored in one or more plain text communications.

8. The computer-implemented method of claim 1, further comprising classifying a particular plain text segment of each plain text communication of the particular cluster as fixed in response to a determination that the particular segment contains one or more patterns of plain text characters that are used to provide visual structure to each plain text communication.

9. The computer-implemented method of claim 1, wherein generating the data extraction template comprises generating the data extraction template to ignore, in one or more plain text communications, content associated with a particular transient plain text segment in response to a determination, based on one or more signals related to plain text communications of the particular cluster, that a semantic data type of the particular transient plain text segment is confidential.

10. A system including memory and one or more processors operable to execute instructions stored in the memory, comprising instructions to:

group a corpus of plain text communications into a plurality of clusters based on one or more shared attributes;

classify one or more plain text segments of each plain text communication of a particular cluster as fixed in response to a determination that a count of occurrences of the one or more plain text segments across the particular cluster satisfies a criterion;

classify one or more remaining plain text segments of each plain text communication of the particular cluster as transient;

generate a tree to represent sequences of classified plain text segments associated with each plain text communication of the particular cluster, wherein the tree includes at least a first branch to represent a first sequence of classified plain text segments corresponding to a first plain text communication of the particular cluster and a second branch to represent at least part of a second sequence of classified plain text segments corresponding to a second plain text communication of the particular cluster, wherein the second sequence of classified plain text segments is different than the first sequence of classified plain text segments;

generate, based on the tree, a data extraction template to extract, from one or more subsequent plain text communications, content associated with transient segments;

extract content associated with at least one transient segment from a given subsequent plain text communication addressed to a user by applying the data extraction template to the given subsequent plain text communication; and rate the extraction performed on the given subsequent plain text communication based on how closely a sequence of classified plain text segments generated for the given subsequent plain text communication traverses a branch of the tree.

11. The system of claim 10, further comprising instructions to identify, in each plain text communication of the particular cluster based on one or more textual patterns, one or more transient plain text segments.

12. The system of claim 11, further comprising instructions to assign generic semantic data types to one or more identified transient plain text segments in each plain text communication of the particular cluster based on the one or more textual patterns.

13. The system of claim 12, further comprising instructions to assign specific semantic data types to one or more transient plain text segments in each plain text communication of the particular cluster based on a context of the plain text communications of the particular cluster or one or more signals.

14. The system of claim 10, wherein the one or more shared attributes comprise a subject or data indicative of a sending entity.

15. The system of claim 14, further comprising instructions to associate a plurality of different sender identifiers with a single sending entity based on one or more textual patterns shared among the plurality of different sender identifiers.

16. At least one non-transitory computer-readable medium comprising instructions that, when execution by a computing system, cause the computing system to perform the following operations:

grouping a corpus of plain text communications into a plurality of clusters based on one or more shared attributes;

classifying one or more plain text segments of each plain text communication of a particular cluster as fixed in response to a determination that a count of occurrences of the one or more plain text segments across the particular cluster satisfies a criterion;

classifying one or more remaining plain text segments of each plain text communication of the particular cluster as transient;

generating a tree to represent sequences of classified plain text segments associated with each plain text communication of the particular cluster, wherein the tree includes at least a first branch to represent a first sequence of classified plain text segments corresponding to a first plain text communication of the particular cluster and a second branch to represent at least part of a second sequence of classified plain text segments corresponding to a second plain text communication of the particular cluster, wherein the second sequence of classified plain text segments is different than the first sequence of classified plain text segments;

generating, based on the tree, a data extraction template to extract, from one or more subsequent plain text communications, content associated with transient segments;

extracting content associated with at least one transient segment from a given subsequent plain text communication addressed to a user by applying the data extraction template to the given subsequent plain text communication; and rating the extracting performed on the given subsequent plain text communication based on how closely a sequence of classified plain text segments generated for the given subsequent plain text communication traverses a branch of the tree.

* * * * *